United States Patent [19]

Baret

[11] Patent Number: 5,297,422
[45] Date of Patent: Mar. 29, 1994

[54] TRACER-GAS LEAK DETECTOR

[75] Inventor: Gilles Baret, Annecy, France

[73] Assignee: Alcatel CIT, Paris, France

[21] Appl. No.: 950,276

[22] Filed: Sep. 24, 1992

[30] Foreign Application Priority Data

Sep. 25, 1991 [FR] France .................... 91 11815

[51] Int. Cl.$^5$ .............................. G01M 3/20
[52] U.S. Cl. .................................. 73/40.7
[58] Field of Search ......................... 73/40.7

[56] References Cited

U.S. PATENT DOCUMENTS

| | | | |
|---|---|---|---|
| 4,773,256 | 9/1988 | Saulgeot | 73/40.7 |
| 4,919,599 | 4/1990 | Reich et al. | 73/40.7 X |
| 4,984,450 | 1/1991 | Burger | 73/40.7 |
| 5,107,697 | 4/1992 | Tallon et al. | 73/40.7 |

Primary Examiner—Hezron E. Williams
Assistant Examiner—Joseph W. Roskos
Attorney, Agent, or Firm—Sughrue, Mion, Zinn, Macpeak & Seas

[57] ABSTRACT

A tracer-gas leak detector includes an analysis unit and a primary pump whose inlet is connected to an inlet orifice of the detector via a first pipe equipped with a first valve. A secondary pumping set has an inlet connected to the analysis unit and an outlet connected to the inlet of the primary pump. The primary pump is a dry pump. The secondary pumping set includes two secondary pumps of the mechanical type separated from each other by a second valve. The secondary pump that is proximate to the dry primary pump is the second secondary pump and includes a dynamic seal stage at its outlet. A second pipe connects the inlet of the second secondary pump to the first pipe downstream from the second valve. A third valve is disposed on the first pipe between the outlet of the second secondary pump and the junction where the second pipe meets the first pipe. The third valve is controlled by a pressure sensor placed at the inlet of the second secondary pump.

4 Claims, 2 Drawing Sheets

TRACER-GAS LEAK DETECTOR

Helium leak detectors have been greatly improved firstly so that the analysis system itself is protected from contaminants coming from the pumping system, and also so that the test pieces are not subjected to vapor from the fluids used in the pumps.

BACKGROUND OF THE INVENTION

Early detectors used oil-diffusion secondary pumps, and their analysis units were protected by means of cryogenic traps which condensed the oil vapor from the diffusion pump. However, the test pieces were not protected from the oil vapor backscattered by mechanical primary pumps having oil seals and serving to pre-evacuate the test pieces to pressures of about $10^{-2}$ mbars.

In the following generation of leak detectors, the oil-diffusion secondary pumps were replaced by mechanical-type pumps (e.g. turbomolecular blade pumps or Holweck-type pumps etc.) which, by construction, do not contain any lubricant (pumps having magnetic bearings) or contain so little lubricant (pumps having ball bearings) that they do not contaminate the analysis unit or the test piece. However, the test piece is still subjected to the action of vapor from the lubricant in the oil seal of the mechanical primary pump during the pre-evacuation stage, i.e. the stage during which the test piece and the pre-evacuation primary pump are directly connected together, even though, by using mechanical secondary pumps capable of operating at pressures of about one mbar, the pre-evacuation stage can be caused to take place under viscous flow only, thereby limiting backscattering of oil vapor towards the test piece. However, that remains unsatisfactory for ultra-clean applications in which the test piece may suffer from the slightest trace of hydrocarbon (the main ingredient of lubricants for mechanical primary pumps having oil seals).

Furthermore, whenever primary pumps with oil seals are used, the surrounding environment receives oil vapor or mist, in particular during high-pressure operation. This can be eliminated by connecting the outlet of the pump to a suction system, but that involves connecting additional pipes leading from the detector to the ventilation system.

Another drawback of leak detectors using primary pumps with oil seals results from the fact that certain precautions must be taken when transporting the apparatus and during operation thereof:

the apparatus must be horizontal both during transport and during operation; and the pump must be emptied before it is transported in a non-pressurized aircraft or under conditions in which it is subjected to large amounts of vibration.

In order to avoid the drawbacks arising from the fact that a fluid is used for lubricating and sealing such primary pumps, they can be replaced by "dry" pumps:

diaphragm pumps;
dry vane pumps;
rotary piston pumps;
reciprocating piston pumps;
peristaltic pumps; and
screw pumps; etc.

However dry pumps suffer from several drawbacks:
they have suction limit pressures that are very high relative to the lower delivery pressures of the secondary pumps;

they have compression ratios that are relatively low for lightweight gases such as helium, and this increases the recovery time of the detector once it has absorbed a certain quantity of helium, and may even make it impossible to use the apparatus for detecting leakage rates that are very low; and they have pumping speeds that are very low at low suction pressures of less then 10 mbars.

An object of the present invention is to provide a leak detector which uses a dry pump as the primary pump, while mitigating the above-mentioned drawbacks and automatically providing good pumping speed at low pressures of less than 10 mbars for pumping out the enclosure to be tested.

SUMMARY OF THE INVENTION

The invention therefore provides a tracer-gas leak detector including an analysis unit, a primary pump whose inlet is connected to an inlet orifice of the detector via a first pipe equipped with a first valve, and a secondary pumping set having its inlet connected to said analysis unit and its outlet connected to the inlet of the primary pump, wherein said primary pump is a "dry" pump, said secondary pumping set including two secondary pumps of the mechanical type separated from each other by a second valve, the secondary pump that is closer to said dry primary pump being referred to as the "second secondary pump" and including a dynamic seal stage at its outlet, and wherein a second pipe connects the inlet of said second secondary pump to said first pipe downstream from said second valve, a third valve being disposed on said first pipe between the outlet of said second secondary pump and the junction where the second pipe meets the first pipe, said third valve being controlled by a pressure sensor placed at the inlet of said second secondary pump.

In accordance with another characteristic, in order to reduce the recovery time of the detector considerably after it has absorbed a certain quantity of helium, the detector includes an inlet orifice upstream from said dry primary pump, which inlet orifice enables a gas distinct from the tracer gas to be injected.

BRIEF DESCRIPTION OF THE DRAWINGS

An embodiment of the invention is described by way of example with reference to the accompanying drawings, in which.

DETAILED DESCRIPTION

Figure 1:
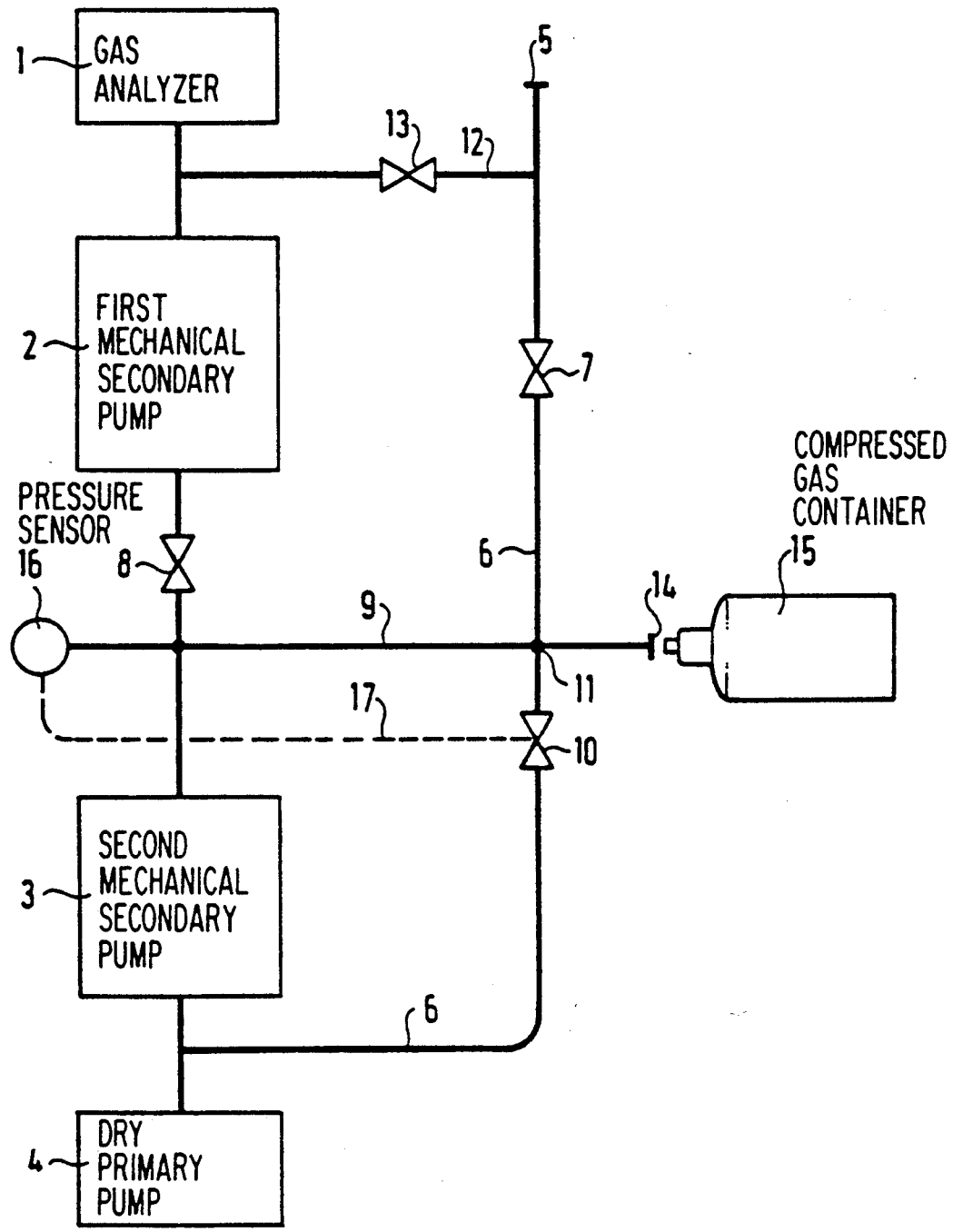
FIG. 1 is a circuit diagram of a leak detector of the invention.
Figure 2:
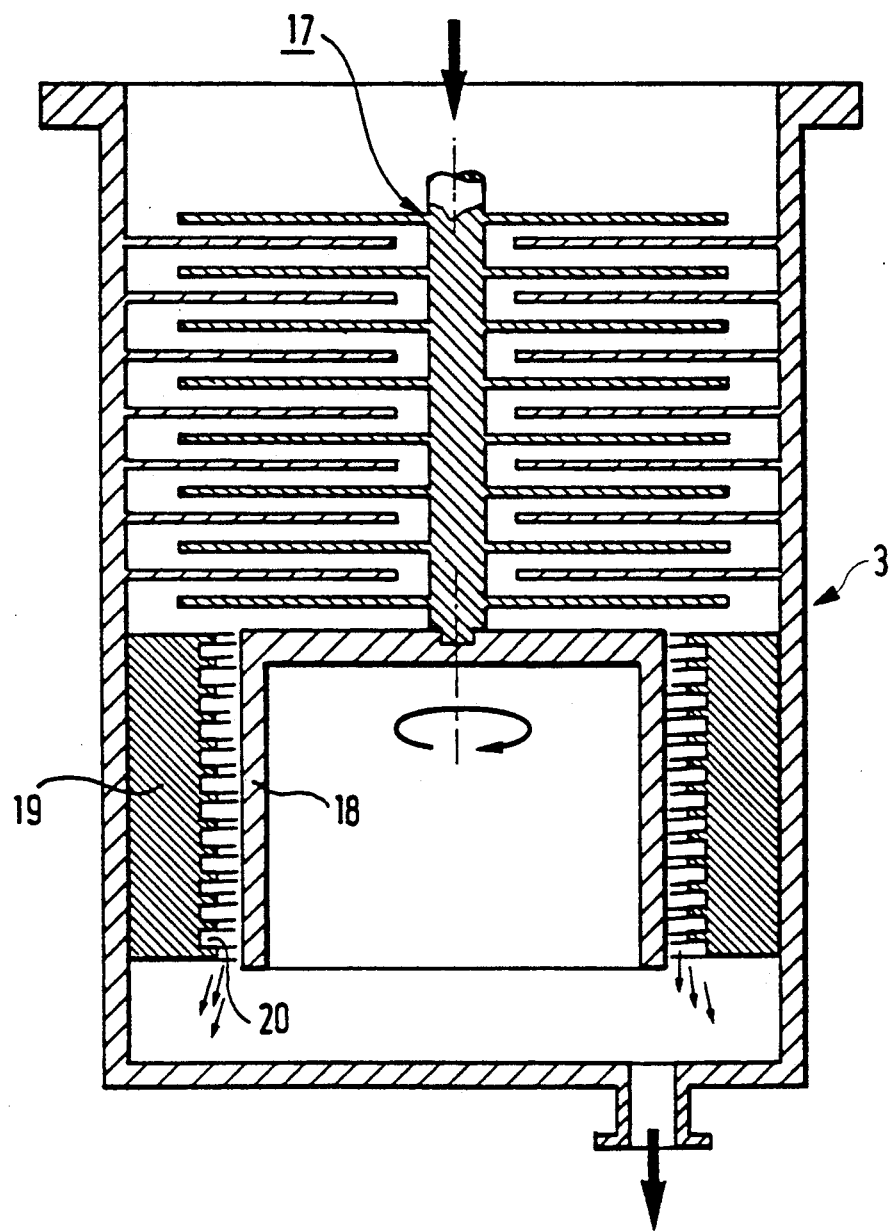
FIG. 2 is an axial section through an embodiment of a mechanical secondary pump including a dynamic seal stage at its outlet.

The detector shown in FIG. 1 includes a gas analyzer 1, and a secondary pumping set including both a first mechanical secondary pump 2 and a second mechanical secondary pump 3. The second mechanical secondary pump 3 is a secondary pump including a dynamic seal stage at its outlet as shown in FIG. 2. The outlet of the second secondary pump 3 is connected to the inlet of a dry primary pump 4 such as one of the above-listed pumps. The detector includes a first inlet orifice 5 designed to be connected to an enclosure to be tested, which first inlet orifice is connected to the inlet of the primary pump 4 via a first pipe 6 equipped with a first valve 7. The first secondary pump 2 and the second secondary pump 3 are separated by a second valve 8.

Downstream from the second valve 8, a second pipe 9 connects the inlet of the second secondary pump 3 to the first pipe 6. A third valve 10 is disposed on the first pipe 6 between the inlet of the primary pump 4 and the junction 11 where the second pipe 9 meets the first pipe 6. A third pipe 12 equipped with a fourth valve 13 connects the inlet 5 of the detector to the gas analyzer 1.

Finally upstream from the primary pump 4, the detector includes a second orifice 14 connected to a compressed-gas container 15. The container is equipped with an expansion system making it possible to deliver expanded gas at a low gas flow rate lying in the approximate range $10^{-1}$ cm$^3$/s to $10^{-2}$ cm$^3$/s.

A pressure sensor 16, placed at the inlet of the second secondary pump 3, controls opening and closing of the third valve 10.

As stated above, the second secondary pump 3 is a secondary pump including a dynamic seal stage at its outlet. The pump may be either a turbomolecular blade pump or of the Holweck type.

FIG. 2 shows a turbomolecular blade pump on the second secondary pump 3 including a dynamic seal at its outlet. The rotor 17 having the blades is extended by a smooth cylindrical rotor 18 which rotates facing a stator portion 19 having a thread 20.

In this way, by means of the secondary pump 3 including a dynamic seal 18, 20 at its outlet, the FIG. 1 detector can deliver at a relatively high pressure, compatible with the high limit pressure of the dry primary pump 4.

Operation is as follows. The test piece connected to the first inlet orifice 5 of the detector is pre-evacuated in two stages: from atmospheric pressure to about 20 mbars, evacuation is performed by the dry primary pump 4 only via the first valve 7, and the third valve 10, valves 13 and 8 being closed; and from 20 mbars and below, the valve 10 controlled by the pressure sensor 16 closes and the test piece is evacuated by the second secondary pump 3 and the primary pump 4. In this way, at low pressures, the flow-rate generated by the secondary pump 3 is used.

The leak-detecting test is then performed, using either counter-current, valves 13 and 10 being closed and valves 7 and 8 being open, or else direct current by opening valves 13 and 8 and closing valves 7 and 10.

Control of the third valve 10 is represented by the dashed line 17.

The gas container 15 enables the recovery time of the detector to be reduced considerably after it has absorbed a certain quantity of helium.

To this end, gas is injected either permanently or else after a test has been conducted.

Naturally, the injected gas is an inert helium-free gas. For example, nitrogen, carbon dioxide, or argon could be used, or any other gas having a helium content of less than one part per million (ppm).

In FIG. 1, the gas is injected at the inlet of the second secondary pump 3. However, the gas may be injected elsewhere, e.g. at any intermediate point in the first secondary pump 2, providing that the injection system is equipped with a valve so as to interrupt the injection during the pre-evacuation stage in order to avoid the pressure of the secondary pump 2 building up again, and thereby adversely affecting operation of the analyzer 1.

An additional advantage of associating pumps 3 and 4 for some of the time during which the enclosure connected to the inlet 5 is being pre-evacuated is that the fourth valve 13 can have a relatively high conductance because, during testing, with the direct-current method, the valve 13 can be opened at a much lower pressure than if pre-evacuation is performed by the primary pump 4 only, since said association enables a much lower pressure to be reached. As a result of it being possible for the valve 13 to have high conductance, the response time of the apparatus is shorter.

I claim:

1. A tracer-gas leak detector including an analysis unit, a primary pump having an inlet connected to a first inlet orifice of the detector via a first pipe equipped with a first valve, and a secondary pumping set having an inlet connected to said analysis unit and an outlet connected to the inlet of the primary pump, wherein the primary pump is a dry pump, said secondary pumping set includes two secondary pumps of the mechanical type separated from each other by a second valve, the secondary pump proximate to said dry primary pump being a second secondary pump and including a dynamic seal stage at an outlet thereof, and wherein a second pipe connects the inlet of said second secondary pump downstream from said second valve, to said first pipe, a third valve is disposed on said first pipe between the outlet of said second secondary pump and a junction where the second pipe meets the first pipe, said third valve being controlled by a pressure sensor placed at the inlet of said second secondary pump.

2. A leak detector according to claim 1, further including a second inlet orifice connected to said first pipe upstream from said dry primary pump, said second inlet orifice enabling a gas distinct from the tracer gas to be injected.

3. A leak detector according to claim 2, wherein said second inlet orifice is connected to a gas container.

4. A leak detector according to claim 1, wherein a third pipe, equipped with a fourth valve, connects said inlet of said detector to the gas analyzer.

* * * * *